(12) United States Patent
Oh

(10) Patent No.: US 11,417,211 B2
(45) Date of Patent: Aug. 16, 2022

(54) SYSTEM, METHOD, INFRASTRUCTURE, AND VEHICLE FOR AUTOMATED VALET PARKING

(71) Applicants: HYUNDAI MOTOR COMPANY, Seoul (KR); KIA MOTORS CORPORATION, Seoul (KR)

(72) Inventor: Tae Dong Oh, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/135,332

(22) Filed: Dec. 28, 2020

(65) Prior Publication Data
US 2021/0201680 A1 Jul. 1, 2021

(30) Foreign Application Priority Data
Dec. 31, 2019 (KR) .................. 10-2019-0179905

(51) Int. Cl.
*B60Q 1/48* (2006.01)
*G08G 1/14* (2006.01)
(Continued)

(52) U.S. Cl.
CPC ............. *G08G 1/142* (2013.01); *B60W 30/06* (2013.01); *G08G 1/0116* (2013.01)

(58) Field of Classification Search
CPC .............. G08G 1/142; G08G 1/0116; G08G 1/096816; G08G 1/09685; G08G 1/143; G08G 1/146; G08G 1/096844; G08G 1/168; B60W 30/06; B60W 30/10; B60W 30/14; B60W 30/18163; B60W 40/02; B60W 40/105; B60W 50/14; B60W 2050/146; B60W 2420/00; B60W 2520/10; B60W 2552/00; B62D 15/0285; B60Y 2300/06; B60Y 2300/10; B60Y 2300/18166; B60Y 2400/30
(Continued)

(56) References Cited

U.S. PATENT DOCUMENTS

2011/0102197 A1* 5/2011 Herwich ................. E01F 9/559
340/932.2
2012/0188100 A1 7/2012 Min
(Continued)

FOREIGN PATENT DOCUMENTS

DE 102008046544 A1 5/2009
DE 102012222560 A1 6/2014

OTHER PUBLICATIONS

European Search Report for European Application No. EP 20 21 7549 dated May 18, 2021 (10 pgs).

*Primary Examiner* — Anh V La
(74) *Attorney, Agent, or Firm* — Fox Rothschild LLP

(57) ABSTRACT

A system for and a method of supporting automated valet parking, and an infrastructure and a vehicle for automated valet parking are provided. An operation method of the infrastructure includes initiating an automated valet parking procedure for a vehicle, determining a target position for the vehicle and a guide route leading to the target position, determining a display range of the guide route based on at least one of vehicle information, driving information, or environment information, and providing the guide route based on the display range.

17 Claims, 13 Drawing Sheets

(51) Int. Cl.
  *B60W 30/06*   (2006.01)
  *G08G 1/01*   (2006.01)
(58) Field of Classification Search
  USPC .......... 340/932.2, 933, 937, 988, 990, 995.1
  See application file for complete search history.

(56) References Cited

U.S. PATENT DOCUMENTS

| | | | |
|---|---|---|---|
| 2017/0212511 A1* | 7/2017 | Paiva Ferreira | G07C 5/008 |
| 2017/0365170 A1* | 12/2017 | Lazic | G08G 1/143 |
| 2018/0307250 A1* | 10/2018 | Harvey | G05D 1/0295 |
| 2018/0345955 A1* | 12/2018 | Kim | B60W 30/06 |
| 2019/0018413 A1* | 1/2019 | Wood | G05D 1/0088 |

\* cited by examiner

【Fig. 1】
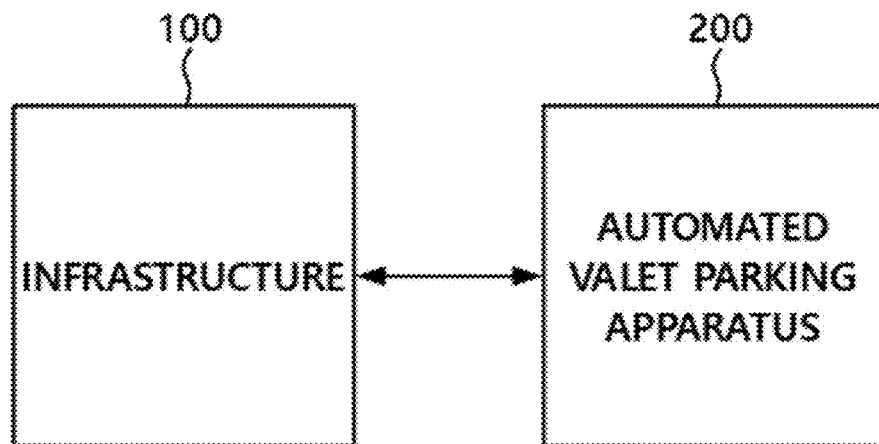
【Fig. 2】
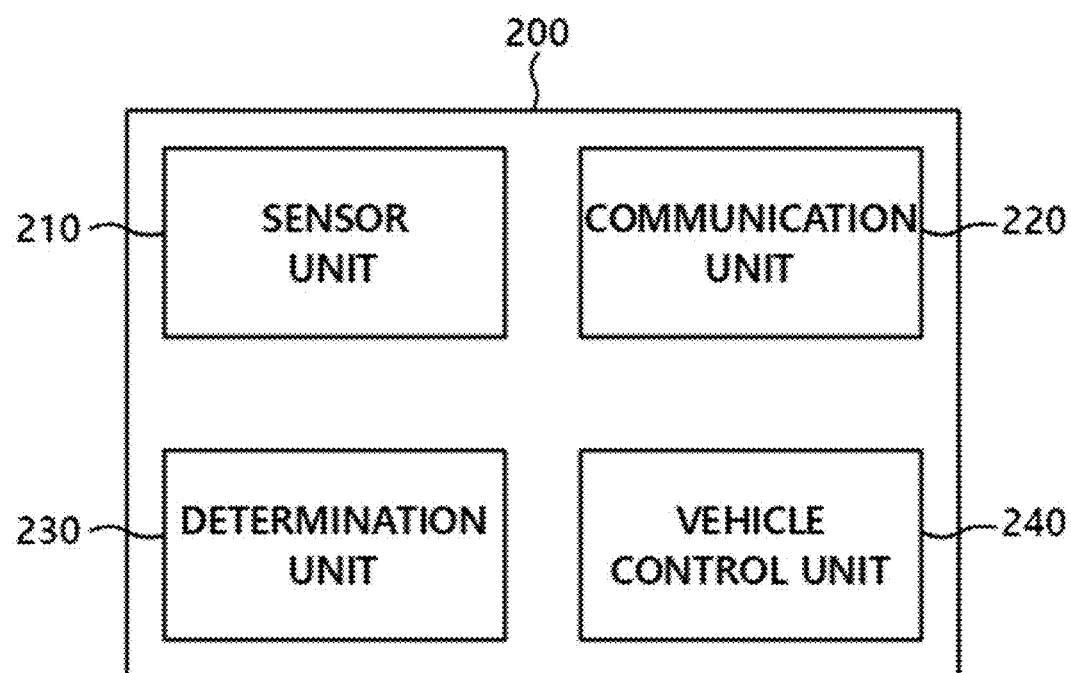

[Fig. 3]
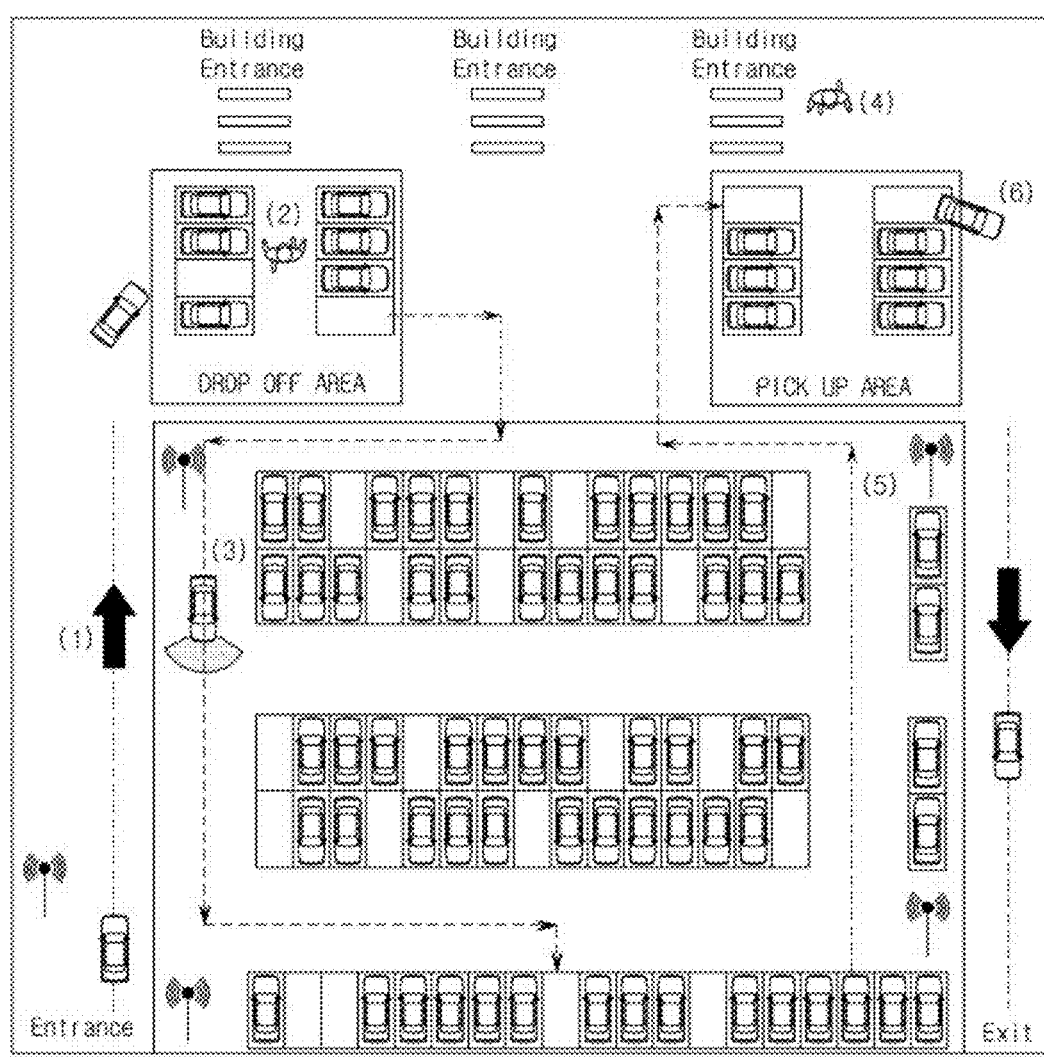

[Fig. 4A]

| Step | Infra | Vehicle |
|---|---|---|
| <1> AVPS START | • Recognize and qualify an appropriate user (by user ID and PW) and vehicle (by unique number assigned to vehicle)<br>• Manage driving authority (receiving driving authority from the user/return the driving authority to the user)<br>• Transmit automated driving start instruction to vehicle | • Perform engine ON/OFF or power ON/OFF according to the instruction of infra<br>• Lock the vehicle according to the instruction of infra<br>• Determine human or animal inside the vehicle |
| <2> DETERMINATION OF TARGET POSITION AND GUIDE ROUTE | • Determine the target position, guide route, and permissive driving area, and deliver those information to vehicle | |
| <3> AUTONOMOUS DRIVING | • Instruct automated driving (start, stop, re-start) to vehicle | • Drive along the guide route designated by infra within the permitted driving area at a speed of 10km/h or less<br>• Drive within the path and width designated by infra without deviation<br>• Drive along a curve with the minimum inner radius of the vent designated by the infra without deviation<br>• Drive on a path with the gradient less than or equal to the maximum gradient designated by infra |
| <4> POSITION MEASUREMENT (vehicle, obstacle) | • Be aware of and manage vehicle location<br>• Detect and recognize vehicle and obstacles (TBD), and monitor safety driving and parking operation of each vehicle (supervise) | • Estimate its own position<br>• Inform the infra of its estimated position/with the accuracy and frequency specified below (TDB)<br>• Inform the infra of its own status<br>• Detect the following obstacles (TBD) |
| <5> AUTONOMOUS PARKING | | • Park and Stop the vehicle at the target position designated by infra (equivalent to PAPS parking requirements) |

[Fig. 4B]

| Step | Infra | Vehicle |
|---|---|---|
| <6> EMERGENCY BRAKE | ● Continue to instruct automated driving to vehicle when safety is ensured as a result of safety confirmation, and to instruct the vehicle to perform an emergency stop, if safety is not confirmed | ● Start/emergency stop/re-start automated driving according to the instruction of infra<br>● Perform an emergency stop in case where a potential hazard is determined as a result of the detection mentioned above<br>● Immediately decelerate at the rate of (TBD) m/s² and stop, when the following conditions are met<br>(1) vehicle received an instruction from infra for E/S<br>(2) vehicle detected an obstacle (TBD)<br>● After coming to a stop, the vehicle shall remain stopped until it receives an instruction from infra to resume automated driving<br>● Vehicle shall re-start suspended driving or parking when it receives an instruction to start automated driving rom the infra after confirming that there is no obstacle ahead in the path |
| <7> AVPS END | ● After the vehicle completes automated driving and parking, the infra transmits Vehicle control release instruction to the vehicle | ● Perform engine ON/OFF or power ON/OFF according to the instruction of infra<br>● Lock the vehicle according to the instruction of infra<br>● Mechanically fix or restrain wheels using such as the parking brake |
| <8> FAULT CONTROL (communication or vehicle fault) | ● Detect communication faults between the infra and vehicle | ● Detect faults in communication with infra during driving<br>● Detect vehicle's faults (e.g. part failure, human or animal remaining inside the vehicle, etc.)<br>● Perform emergency stop when above fault is detected<br>● After coming to a stop, the vehicle shall remain stopped until it receives an instruction from infra to resume automated driving |

[Fig. 5]

| DATA | Contents | Transmit(T)/Receive(R) | | Regularly(F)/Event(E) Transmission | Note |
|---|---|---|---|---|---|
| | | Infrastructure | Vehicle | | |
| (1) Vehicle qualification information | ID number (VIN) to identify each vehicle | R | T | E When entering the parking | |
| (2) Automated driving preparation instruction | - | T | R | E Right before automated driving start | This is also used for communication fault check by the vehicle |
| (3) Vehicle information notification | Vehicle state (normal stop/driving/emergency stop, etc.), Vehicle position(should) | R | T | F(1Hz) | |
| (4) Vehicle information response | - | T | R | F(1Hz) | |
| (5) Target position-guide route Delivery | Target position - Passing point location/Permitted time to pass through the point, Maximum speed | T | R | E After automated driving instruction | |
| (6) Driving boundaries delivery | A group of lines to surround the permitted driving area | T | R | E After automated driving preparation instruction | |
| (7) Automated driving start instruction | - | T | R | E After delivery of guide route and driving boundaries, when restarting after emergency stop | |
| (8) Emergency stop instruction | - | T | R | E | |
| (9) Vehicle control release instruction | - | T | R | E | |

[Fig. 6]
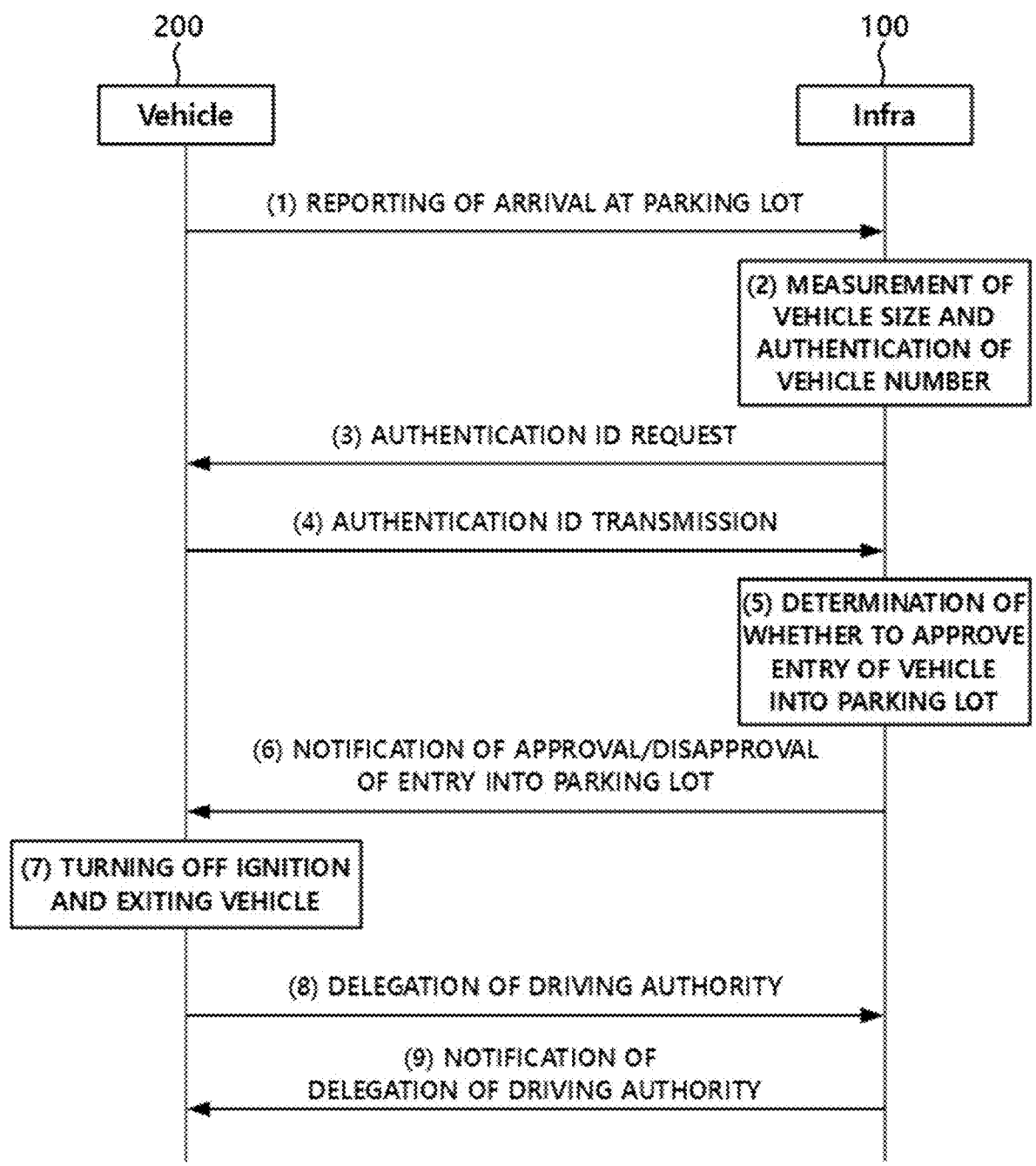

[Fig. 7]
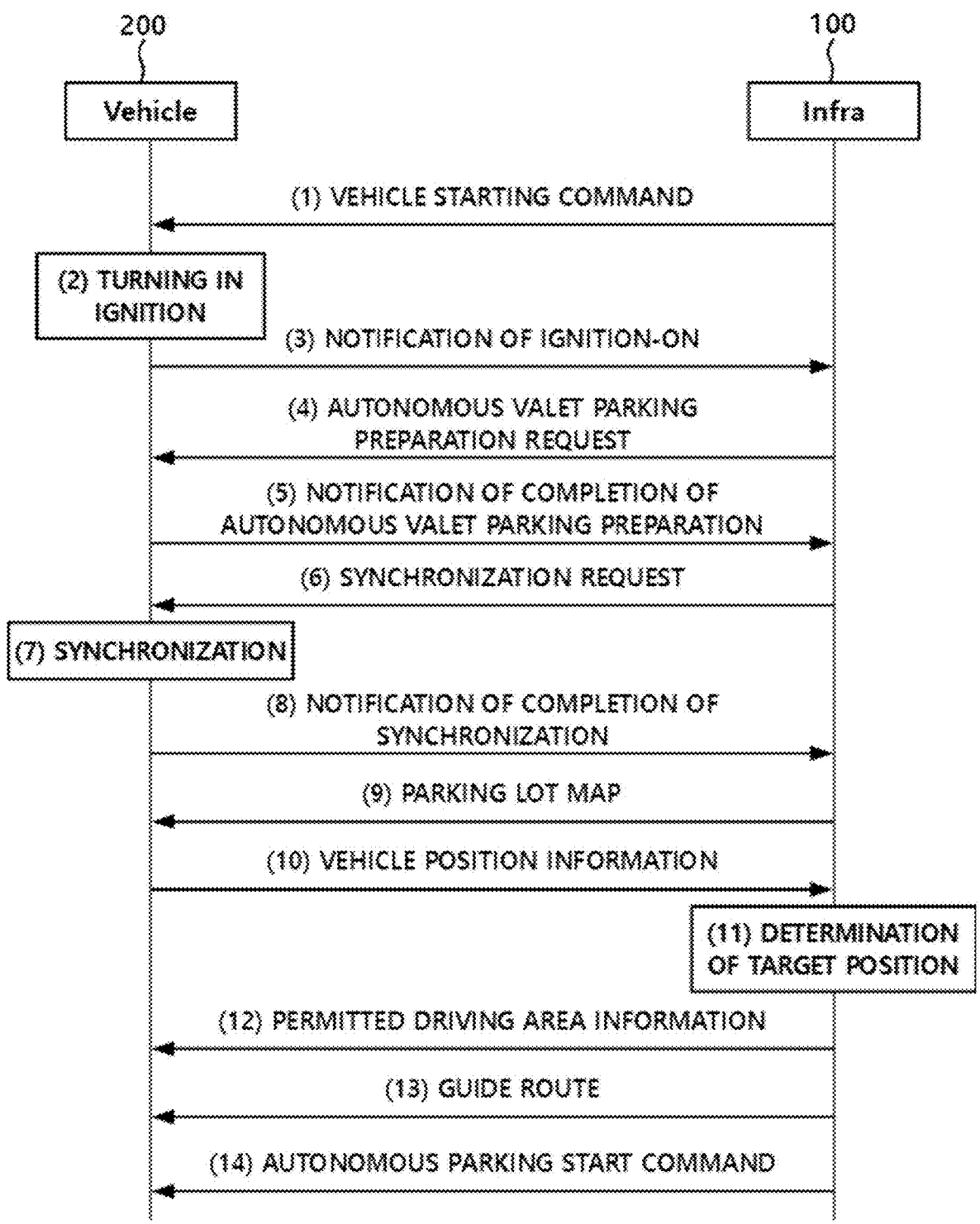

[Fig. 8]
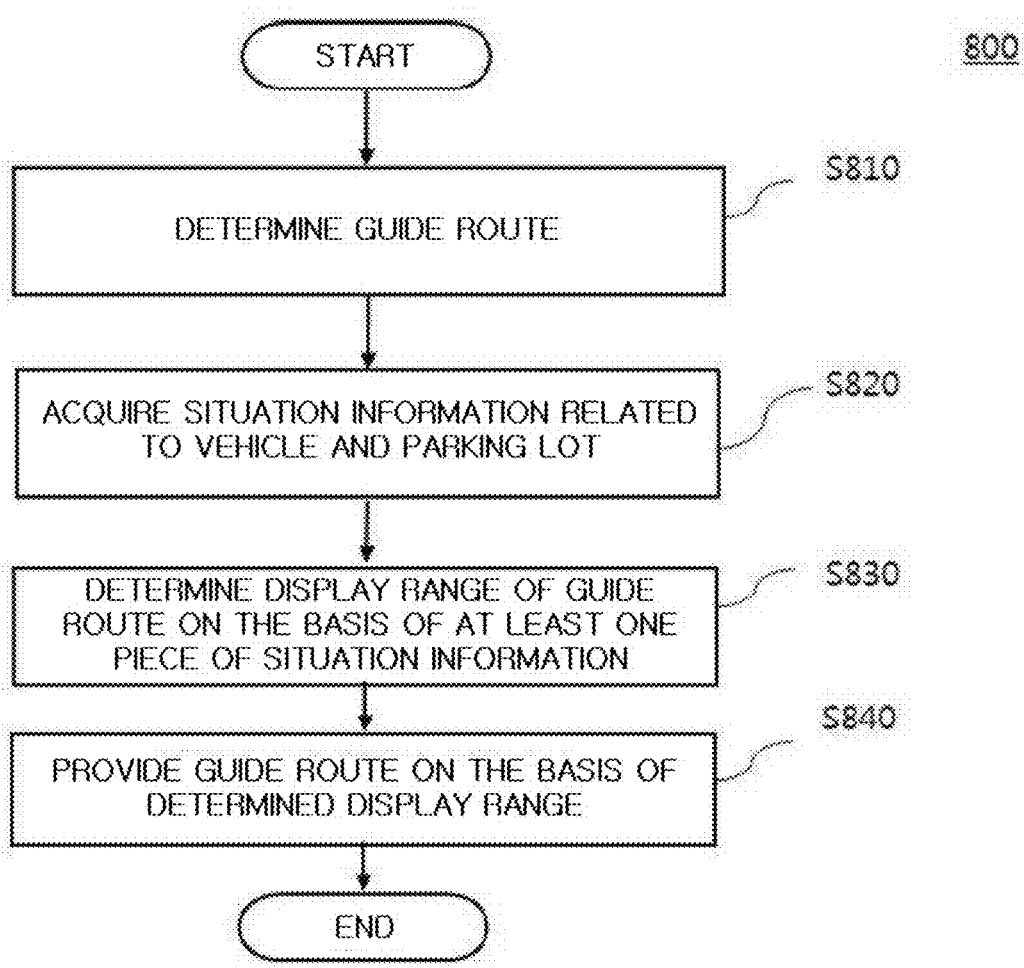

[Fig. 9A]
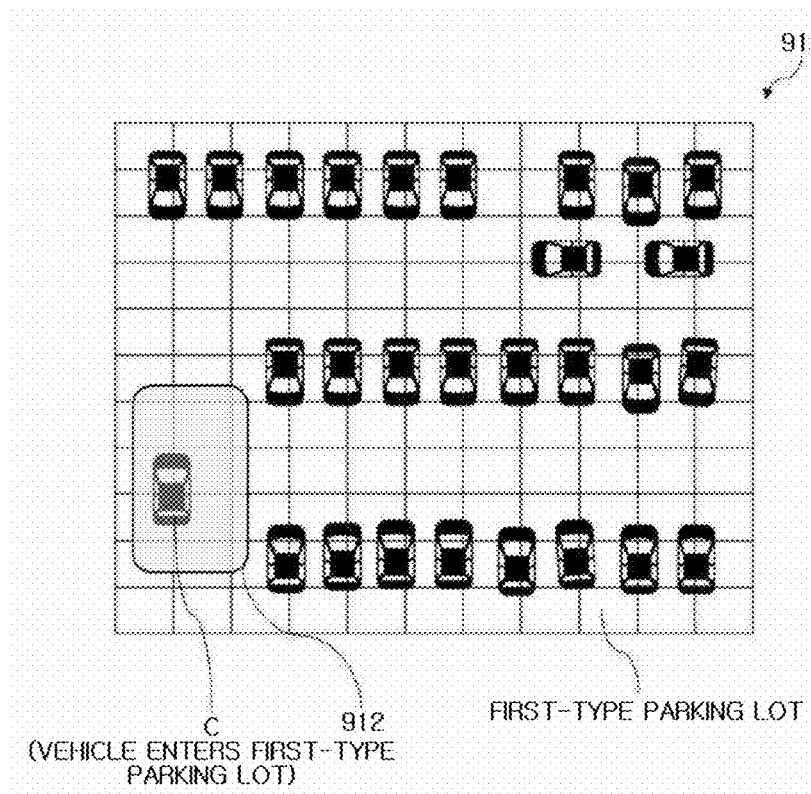
[Fig. 9B]
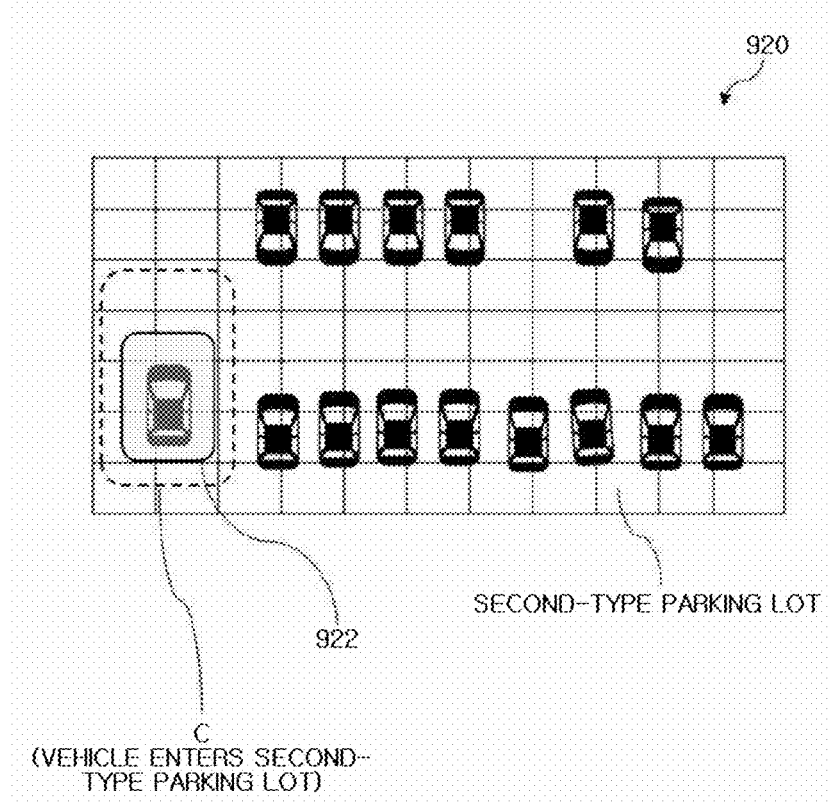

[Fig. 10A]
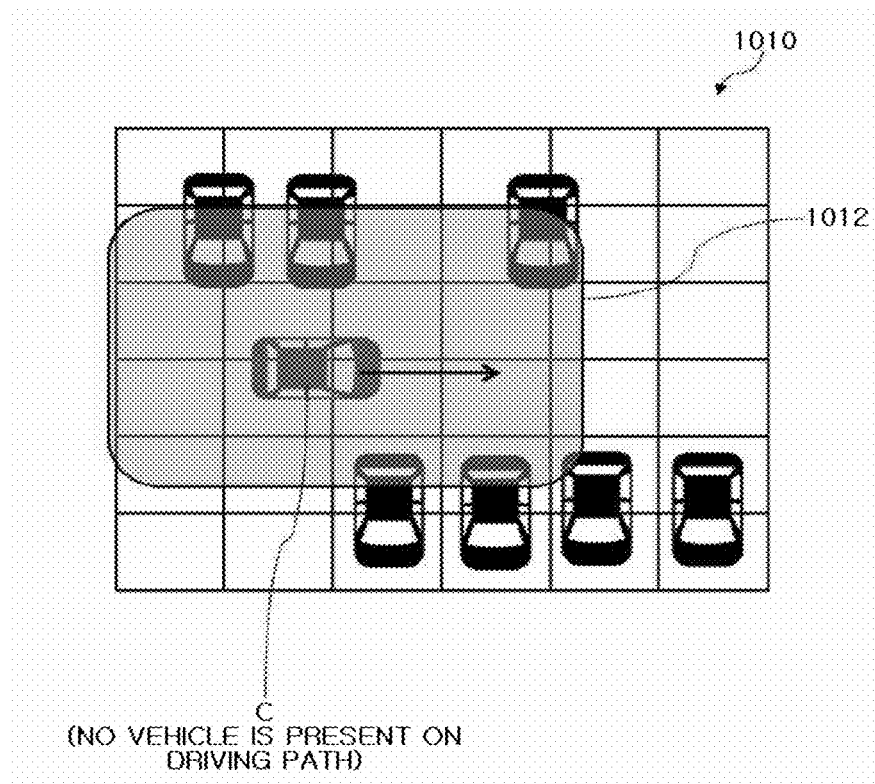
C
(NO VEHICLE IS PRESENT ON DRIVING PATH)
[Fig. 10B]
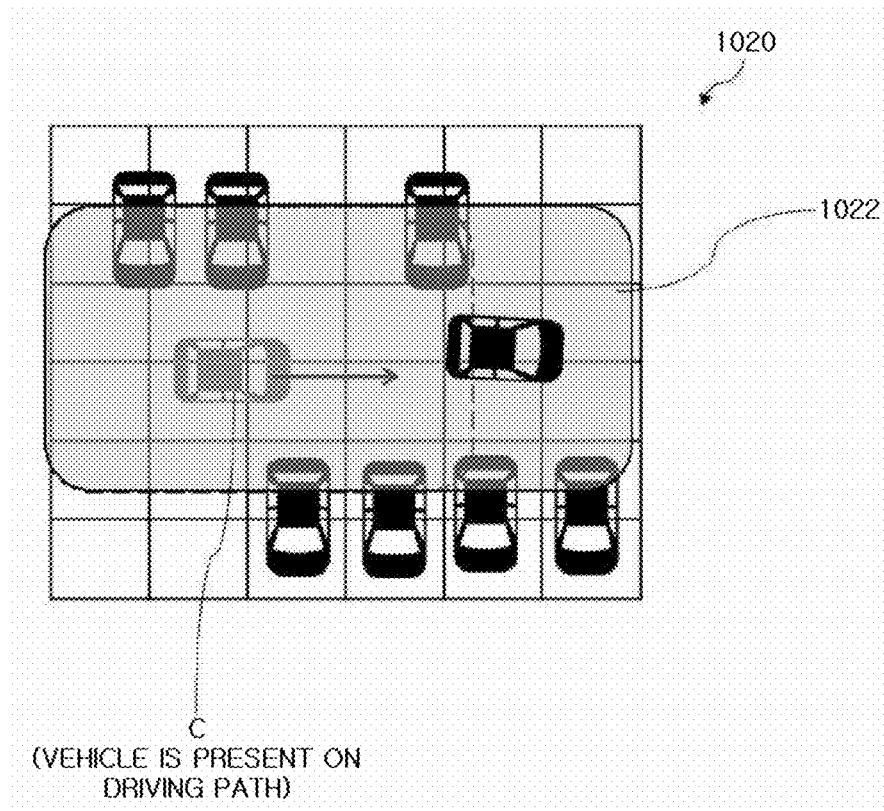
C
(VEHICLE IS PRESENT ON DRIVING PATH)

[Fig. 11A]
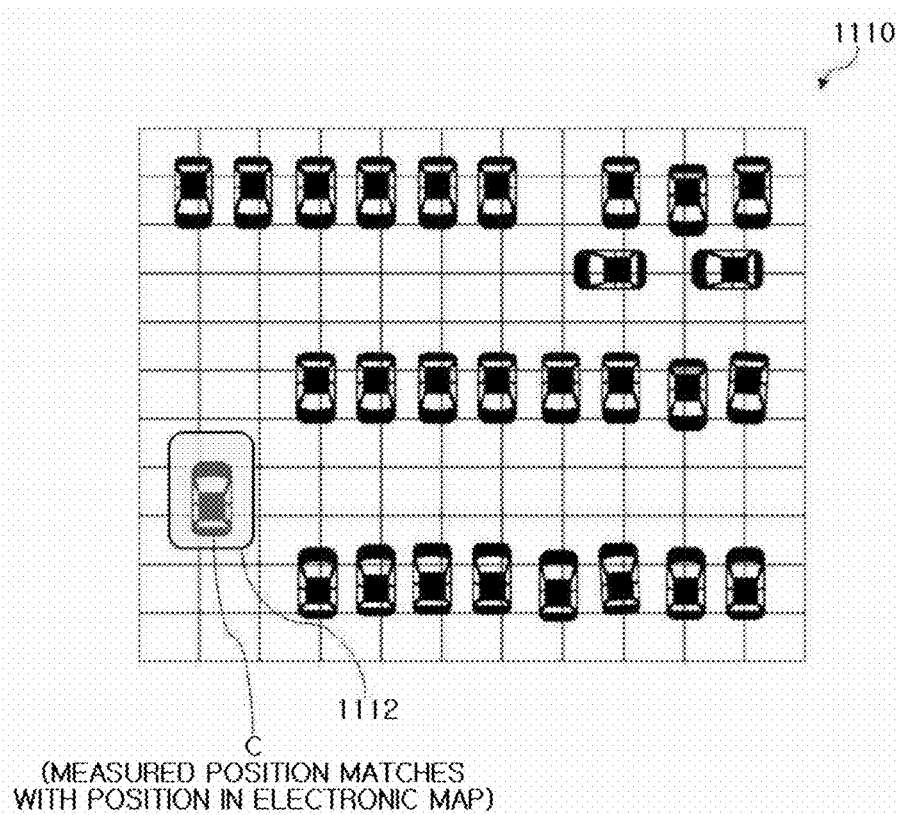
C (MEASURED POSITION MATCHES WITH POSITION IN ELECTRONIC MAP)
[Fig. 11B]
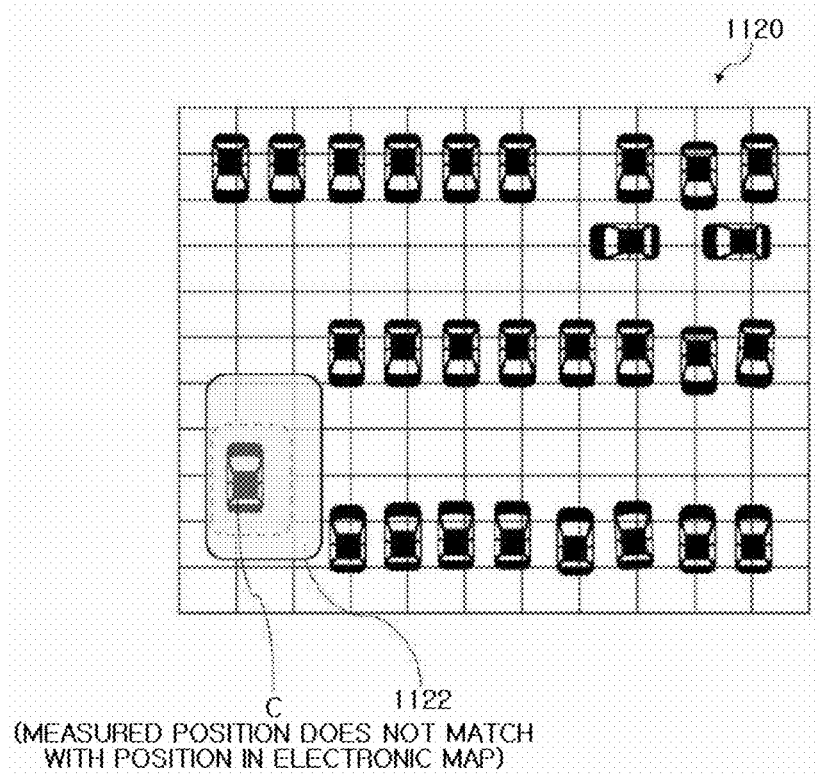
C (MEASURED POSITION DOES NOT MATCH WITH POSITION IN ELECTRONIC MAP)

[Fig. 12A]
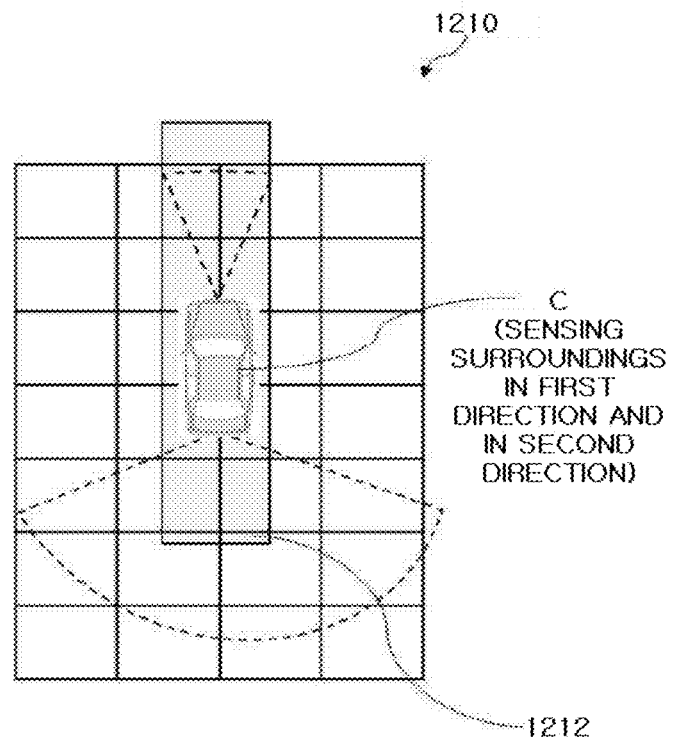
[Fig. 12B]
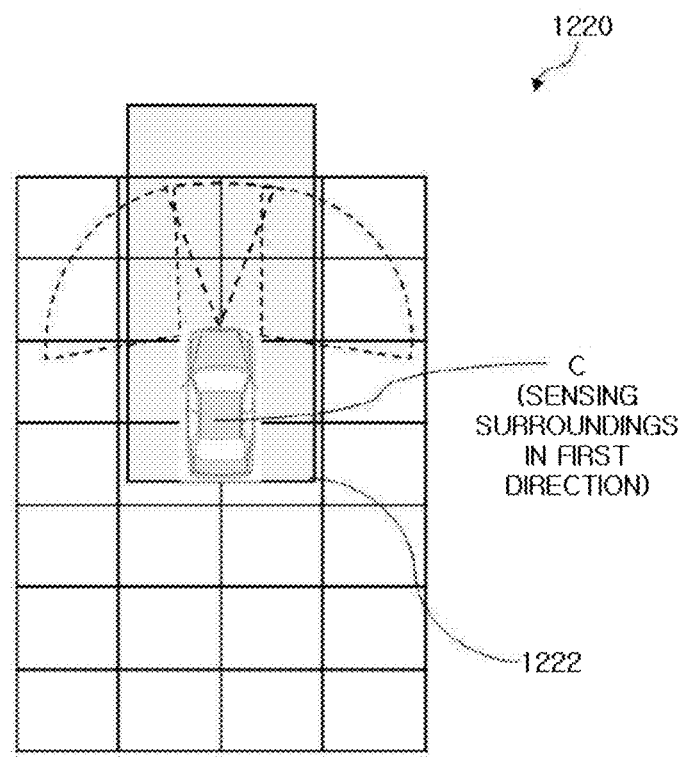

[Fig. 13A]
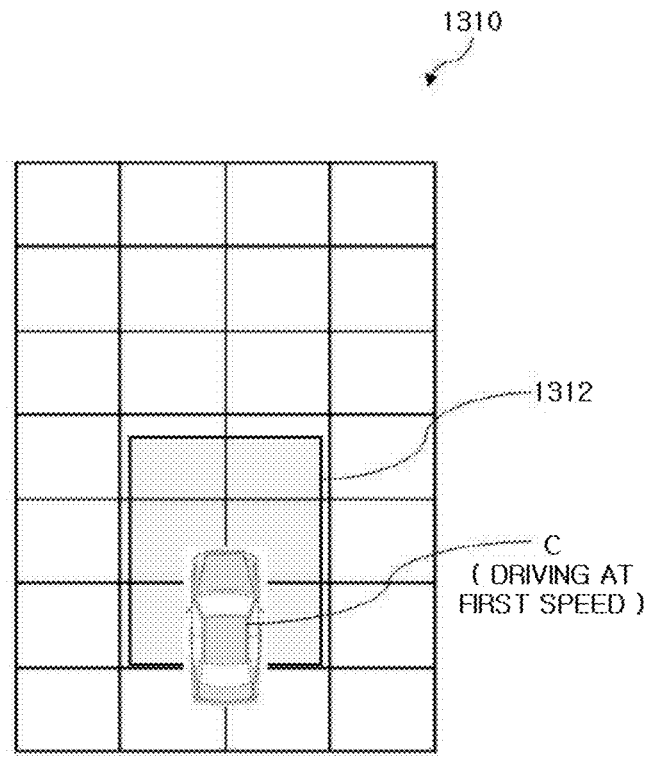
[Fig. 13B]
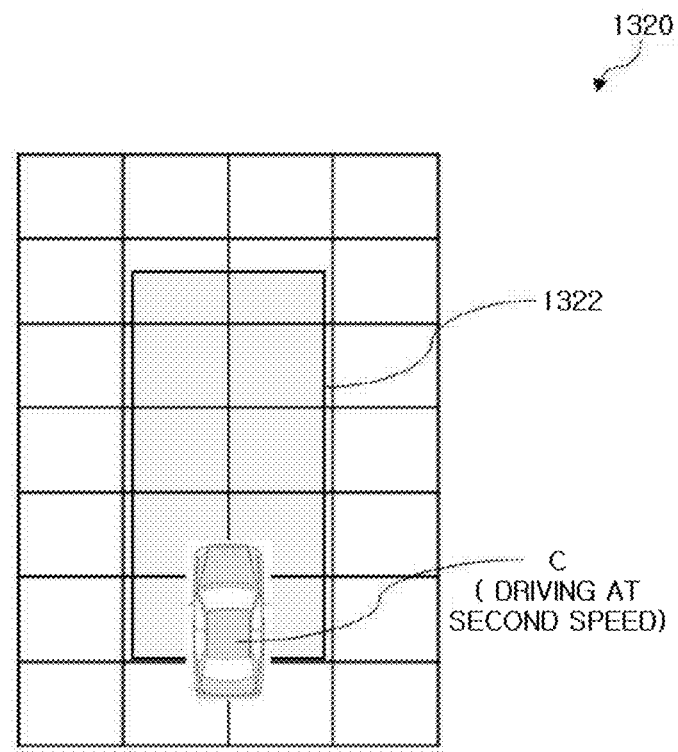

SYSTEM, METHOD, INFRASTRUCTURE, AND VEHICLE FOR AUTOMATED VALET PARKING

CROSS REFERENCE TO RELATED APPLICATION

The present application claims priority to Korean Patent Application No. 10-2019-0179905, filed Dec. 31, 2019, the entire contents of which is incorporated herein for all purposes by this reference.

TECHNICAL FIELD

The present disclosure relates to an automated valet parking system, an automated valet parking method, and an automated valet parking infrastructure, and a vehicle having an automated valet parking feature. The present disclosure enables a vehicle to autonomously move to and park in a designated parking spot by communicating with a parking infrastructure. The present disclosure also enables a vehicle to autonomously move from a parking spot to a pickup area by communicating with a parking infrastructure.

BACKGROUND

The statements in this section merely provide background information related to the present disclosure and may not constitute prior art.

Many modern cities suffer from various problems associated with vehicle parking. For example, there is a risk of a car collision in a parking lot. For parking in crowded places such as a large shopping center, people spend much time to enter a parking lot around the destination due to traffic congestion. Furthermore, it also takes time to locate an empty parking spot even after entering a parking lot. In addition, there is inconvenience that a driver has to move to a spot at which his or her vehicle is parked at the time of leaving the visited area or that a driver often has difficulty in retrieving his or her vehicle due to forgetting the parking spot where his or her vehicle is parked.

SUMMARY

The present disclosure provides an automated valet parking service by which a driver can leave his or her vehicle at a predetermined drop-off area when vising a place and the vehicle autonomously moves to and parks at an empty parking spot in a parking lot.

The present disclosure also enables an automated valet parking service by which a vehicle that has been parked autonomously moves from a parking spot to a predetermined pickup area so that the driver can conveniently leave the parking lot.

The present disclosure further enables an automated valet parking service that provides a portion of the entire path of a guide route leading to a target position on the basis of at least one of vehicle information, driving information, and environment information.

The technical problems to be solved by the present disclosure are not limited to the above-mentioned ones, and other technical problems which are not mentioned above will be clearly understood from the following description by those skilled in the art.

An operation method of an infrastructure supporting an automated valet parking service, according to embodiments of the present disclosure, includes: initiating an automated valet parking procedure for a vehicle; determining a target position for the vehicle and a guide route leading to the target position; determining a display range of the guide route on the basis of at least one of vehicle information, driving information, or environment information; and providing the guide route on the basis of the determined display range.

An automated valet parking method according to embodiments of the present disclosure includes: initiating an automated valet parking procedure for a vehicle; determining, by an infrastructure, a target position for the vehicle and a guide route leading to the target position; determining, by the infrastructure, a display range of the guide route on the basis of at least one of vehicle information, driving information, or environment information; providing, by the infrastructure, the guide route to the vehicle on the basis of the determined display range; and performing, by the vehicle, automated valet parking on the basis of the guide route.

The automated valet parking system according to embodiments of the present disclosure provides a portion of the entire path of the guide route along which the vehicle needs to move to reach the target position on the basis of at least one of vehicle information, driving information, or environment information, thereby reducing the power consumption of the guide route and preventing the guide route for a vehicle from being interfered by another guide route for another vehicle.

The effects and advantages that can be achieved by the present disclosure are not limited to the ones mentioned above, and other effects and advantages which are not mentioned above but can be achieved by the present disclosure can be clearly understood by those skilled in the art from the following description.

DRAWINGS

FIG. 1 is a diagram illustrating an automated valet parking system in one form of the present disclosure;

FIG. 2 is a diagram illustrating an automated valet parking device in one form of the present disclosure;

FIG. 3 is a conceptual diagram illustrating an automated valet parking system and an automated valet parking method in one form of the present disclosure;

FIGS. 4A and 4B are diagrams illustrating operations performed by a vehicle and an infrastructure for automated valet parking, in one form of the present disclosure;

FIG. 5 is a diagram illustrating a communication process performed by a vehicle and an infrastructure for automated valet parking, in one form of the present disclosure;

FIG. 6 is a diagram illustrating a communication process performed by a vehicle and an infrastructure for automated valet parking, in one form of the present disclosure;

FIG. 7 is a diagram illustrating a communication process performed by a vehicle and an infrastructure for automated valet parking, in one form of the present disclosure;

FIG. 8 is a flowchart illustrating an operation method of an infrastructure supporting automated valet parking, in one form of the present disclosure;

FIGS. 9A and 9B are diagrams for illustrating an operation of determining a display range of a guide route on the basis of environment information, in one form of the present disclosure;

FIGS. 10A and 10B are diagrams for illustrating an operation of determining a display range of a guide route on the basis of environment information, in one form of the present disclosure;

FIGS. 11A and 11B are diagrams illustrating an operation in which a guide route display range is determined in a situation in which a vehicle is navigated on the basis of a precise map, in one form of the present disclosure;

FIGS. 12A and 12B are diagrams for illustrating an operation of determining a display range of a guide route display the basis of vehicle information, in one form of the present disclosure; and FIGS. 13A and 13B are diagrams for illustrating an operation of determining a guide route display range on the basis of driving information, in one form of the present disclosure.

DETAILED DESCRIPTION

Herein below, exemplary embodiments of the present disclosure will be described in detail with reference to the accompanying drawings. The construction and operational effect of the present disclosure will be clearly understood from the following detailed description. Prior to describing exemplary embodiments of the present disclosure in detail, it is noted that throughout the drawings the same components will be denoted by the same reference numerals when possible and a detailed description about existing components and functions is omitted when the subject matter of the present disclosure may be obscured by the description.

It is also noted that terms used in the detailed description of the present disclosure are defined below.

The term "driver" refers to a person who uses an automated valet parking service provided by an automated valet parking system.

The term "driving authority" refers to the authority to control vehicle operations. The term "vehicle operation" refers to an operation such as steering, accelerating, braking, gear shifting, engine activation/deactivation, and vehicle door locking/unlocking.

The term "vehicle" refers to a vehicle having an automated valet parking feature.

The term "control center" refers to a facility that can monitor vehicles parked in a parking space. The control center determines a target position, a guide route, a permitted driving area, or the like and transmits various instructions including a driving start command and an emergency stop command to a vehicle.

The term "infrastructure" includes a parking facility and sensors installed in the parking facility. Alternatively, in some cases, the term "infrastructure" may refer to a control center that controls gates of a parking space, vehicles existing within a parking space, etc.

The term "target position" refers to a parking spot available for parking. Alternatively, in a case where drivers leave a parking lot, the term "target position" may refer to a pickup area where the drivers take back their vehicles to leave the parking lot.

The term "guide route" refers to a route that guides a vehicle to a target position. For example, in a vehicle parking session, the guide route is a route that guides a vehicle from a drop-off area to an empty parking spot. For example, the guide route is provided in the form of instructions. Specifically, it will include instructions such as "move straight 50 m" and "turn left at the next corner".

The term "driving route" refers to a driving path along which a vehicle needs to travel.

The term "permitted driving area" refers to an area where a vehicle can travel within a parking lot. For example, the permitted driving area includes a driving lane. The permitted driving area is defined with barrier walls, parked vehicles, lines, etc.

FIG. 1 is a diagram illustrating an automated valet parking system according to one embodiment of the present disclosure. Referring to FIG. 1, an automated valet parking system 10 includes an infrastructure 100 and an automated valet parking apparatus 200.

The infrastructure 100 refers to an apparatus or system for operating, managing, and controlling constituent elements involved in automated valet parking. For example, the infrastructure 100 may be a facility in a parking lot. According to embodiments, the infrastructure 100 includes sensors, communication devices, alarm devices, display devices, and a server device that controls those devices. Alternatively, in some cases, the team "infrastructure" may refer to a control center that controls gates of a parking space, vehicles existing within a parking space, etc.

The automated valet parking apparatus 200 refers to a vehicle that can perform automated valet parking. Alternatively, the automated valet parking apparatus 200 may refer to a constituent element or a set of constituent elements of a vehicle, which are required to perform automated valet parking.

FIG. 2 is a diagram illustrating an automated valet parking apparatus according to one embodiment of the present disclosure. Referring to FIG. 2, the automated valet parking device (for example, vehicle 200) includes a sensor unit 210, a communication unit (i.e., transceiver) 220, a determination unit (for example, a processor) 230, and a vehicle control unit 240.

The sensor unit 210 monitors the surroundings of the automated valet parking apparatus 200. According to embodiments, the sensor unit 210 measures the distance between the automated valet parking apparatus 200 and a specific object or senses a nearby object around the automated valet parking apparatus 200. For example, the sensor unit 210 includes at least one of the sensors selected from among an ultrasonic sensor, a radar sensor, a LiDAR sensor, a camera, an infrared sensor, a thermal sensor, and a millimeter wave sensor.

The sensor unit 210 is configured to transmit collected data to the communication unit 220 or to the vehicle control unit 240.

The communication unit 220 communicates data with the infrastructure facility 100. This communication is called vehicle-to-infra (V2I) communication. This communication is called "vehicle to infra (V2I)" communication. The communication unit 220 communicates data with other vehicles. This communication is called vehicle-to-vehicle (V2V) communication. The V2I communication and the V2V communication are collectively called vehicle-to-everything (V2X) communication. According to embodiments, the communication unit 220 receives data such as a target position, a guide route, a driving route, an instruction, or the like from the infrastructure 100, processes the received data, and transmits data generated through the processing to the determination unit 230. The communication unit 220 transmits data collected and generated by the automated valet parking apparatus 200 to the infrastructure 100. According to embodiments, the communication unit 220 exchanges data with the automated valet parking apparatus 200.

The communication unit 220 receives and transmits the data according to a wireless communication protocol or a cable communication protocol. Examples of the wireless communication protocol include but are not limited to wireless LAN (WLAN), digital living network alliance (DLNA), wireless broadband (Wibro), world interoperability for microwave access (Wimax), global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSPDA), high speed uplink packet access (HSUPA), IEEE802.16, long term evolution (LTE), long term evolution-advanced (LTE-A), wireless mobile broadband service (WMBS), Bluetooth, infrared data association (IrDA), ultra-wideband (UWB), ZigBee, near field communication (NFC), ultra sound communication (USC), visible light communication (VLC), Wi-Fi, and Wi-Fi direct. Examples of the cable communication protocol include but are not limited to wired local area network (LAN), wired wide area network (WAN), power line communication (PLC), USB communication, Ethernet communication, serial communication, and optical/coaxial cable communication. Other protocols that support communication between devices fall within the definition of the communication protocol that is used in the present disclosure.

The determination unit 230 controls the overall operation of the automated valet parking apparatus 200. The determination unit 230 controls the vehicle control unit 240 on the basis of the data transmitted from the sensor unit 210 and the communication unit 220. According to embodiments, the determination unit 230 generates a control signal to adaptively control the vehicle control unit 240 according to the data transmitted from the infrastructure 100 and transmits the control signal to the vehicle control unit 240.

That is, the determination unit 230 refers to a device that performs a series of computations or that makes a series of determinations to control the automated valet parking apparatus 200 for the purpose of automated valet parking. For example, the determination unit 230 may be a processor capable of executing a software program including instructions for performing automated valet parking for a vehicle. Examples of the determination unit 230 include but are not limited to a central processing unit (CPU), a microprocessor unit (MPU), an application specific integrated circuit (ASIC), a field programmable gate array (FPGA), and a graphic processing unit (GPU).

The vehicle control unit 240 controls the automated valet parking apparatus 200 according to the control of the determination unit 230. According to some embodiments, the vehicle control unit 240 controls the automated valet parking apparatus 200 in response to a control signal transmitted from the determination unit 230. Specifically, the vehicle control unit 240 controls various vehicle operations such as driving, stopping, re-driving, steering, accelerating, decelerating, parking, lighting, flashing, alarm sounding, etc.

That is, it is noted that the vehicle control unit 240 can perform all functions required to control the operations of the automated valet parking apparatus 200. Specifically, the vehicle control unit 240 controls a driving unit, a braking unit, a steering unit, an acceleration unit, an alarm unit, and a flasher of the automated valet parking apparatus 200.

On the other hand, although not explicitly described herein, it is noted that the operations and/or functions of the automated valet parking apparatus 200 are performed by the conjunction of one or more components selected from among the sensor unit 210, the communication unit 220, the determination unit 230, and the vehicle control unit 240.

FIG. 3 is a conceptual diagram illustrating an automated valet parking system and an automated valet parking method according to embodiments of the present disclosure.

Referring to FIG. 3, in step (1), a driver drives a vehicle (for example, automated valet parking apparatus 200 of FIG. 1) to enter a parking lot and to reach a drop-off area in the parking lot.

In step (2), when arriving at the drop-off area, the driver gets out of the vehicle and delegates the authority to drive or control the vehicle to an infrastructure (for example, infrastructure 100 of FIG. 1).

In step (3), the infrastructure searches for available parking spots in the parking lot and designates one of the available parking spots for the vehicle. The infrastructure determines a guide route leading to the designated parking spot. After the parking spot and the guide route are determined, the vehicle autonomously drives in accordance with the guide route until reaching the designated parking spot and performs autonomous parking at the designated parking spot.

In step (4), the driver moves to a pickup area where the vehicle will be returned to the driver to leave the parking lot.

In step (5), the infrastructure determines a suitable target position. Specifically, in this step, the suitable target position may be one of empty parking spots within the pickup area. In addition, the infrastructure determines a guide route which will guide the vehicle to the target position. After the target position and the guide route are determined and transmitted to the vehicle, the vehicle autonomously drives in accordance with the guide route until reaching the target position and performs autonomous parking at the target position.

In step (6), the driver arrives at the pickup area and takes over the authority to control the vehicle. The driver drives the vehicle toward the exit of the parking lot.

FIGS. 4A and 4B are diagrams illustrating operations performed by a vehicle and an infrastructure for automated valet parking, according to one embodiment of the present disclosure.

Item (1) describes the operation of the infrastructure (for example, the infrastructure 100 of FIG. 1) and the operation of the vehicle (for example, the automated valet parking apparatus 200 of FIG. 1) at the time of initiating an automated valet parking procedure. The infrastructure identifies a driver and a vehicle and determines whether the driver and the vehicle are qualified for parking in a specific parking place. For example, the infrastructure determines whether the driver is qualified by reading an identification number (ID) or a password that is presented by the driver. The infrastructure determines whether the vehicle is qualified by reading a vehicle identification number which is a unique number of the vehicle. The vehicle can activate and deactivate the engine by itself. The vehicle can turn on and off the power supply by itself. A state in which the vehicle engine is deactivated and the power supply is turned on is referred to as an accessory-on (ACC-On) state. The activation/deactivation of the engine and the on/off operation of the power supply may be performed according to external instructions received from the infrastructure or may be performed without depending on the external instructions. The vehicle can lock and unlock the doors by itself. The locking and unlocking of the vehicle doors may be performed according to external instructions received from the infrastructure or may be performed without depending on the external instructions. Preferably, the vehicle locks the vehicle doors before performing automated parking. Preferably, the driving authority for the vehicle is delegated to the infrastructure from the vehicle. The driving authority means an authority to control the operations of the vehicle. The vehicle operations include steering, accelerating, braking, gear shifting, engine activation/deactivation, and door locking/unlocking. Since the driving authority for the vehicle is delegated to the infrastructure, the infrastructure takes complete control of the vehicle during the automated valet parking process for the vehicle. Accordingly, the vehicle is prevented from performing an unexpected operation, thereby reducing accidents in the parking lot. However, in some cases, the driving authority may be partially delegated to the infrastructure so that the vehicle can still control some of the vehicle operations, or the driving authority may be shared by the vehicle and the infrastructure. For example, a braking operation needs to be performed when an emergency occurs during the automated valet parking procedure. Therefore, when the vehicle detects a danger with the help of an ADAS sensor, the vehicle applies a brake without the intervention of the infrastructure. In addition, the vehicle checks whether a person or animal remains in the vehicle. Since vehicles are usually parked for long hours in a parking lot, if a person or animal is accidentally left in the vehicle during the parking duration, the person or animal would be in danger. Therefore, it is important to ensure that the vehicle is empty before starting an automated valet parking process. The checking for determining whether a person or animal is present in the vehicle is performed with the help of sensors mounted in the vehicle. When the automated valet parking is finished, the driving authority is automatically returned to the driver from the infrastructure.

An arrival process in which a vehicle enters a parking lot and performs parking in a specific parking spot within the parking lot is similar to a departure process in which a parked vehicle leaves the parking lot. Specifically, the vehicle receives a departure request. The driver (i.e., owner or user of the vehicle) makes the departure request using a communication device, such as smartphone or mobile terminal, which can communicate with the infrastructure. When the driver makes the departure request, the driver transmits vehicle information and driver information to the infrastructure using the communication device. The infrastructure determines whether a target vehicle of the departure request is actually parked in the parking lot on the basis of the received vehicle information and the received driver information and checks whether the driver is a qualified driver. When the vehicle receives the departure request, the vehicle or the infrastructure checks whether a passenger is present in the vehicle. When it is determined that no passenger is present in the vehicle, the next step is performed. When the driver makes the departure request, the driving authority is delegated from the driver to the vehicle or the infrastructure. That is, when the driver sends the departure request, the driver loses the authority to control the vehicle. In this case, the vehicle is self-controlled by a built-in controller or controlled by the infrastructure. For example, the vehicle is controlled by the built-in controller or the infrastructure such that the vehicle doors are locked when the vehicle leaves the parking spot and are unlocked when the vehicle arrives at the pickup area. When the vehicle arrives at the pickup area, the driving authority is returned to the driver from the vehicle or the infrastructure.

However, as described above, there is a case where the driving authority is partially owned by the vehicle rather than the entire driving authority being delegated to the infrastructure, or there is a case where the driving authority of the vehicle is shared by the vehicle and the infrastructure. After receiving the departure request, the vehicle performs operations to pick up the driver and leave the parking lot. That is, the vehicle departs from the parking spot upon receiving a departure signal. To this end, the infrastructure can control the vehicle so that the engine of the vehicle is activated. The infrastructure notifies the driver of the departure of the vehicle from the parking spot.

In step (2), a target position, a guide route, and a driving route are determined. The determination of the target position, the guide route, and the driving route is performed by the infrastructure. The target position, the guide route, and the driving route determined by the infrastructure are transmitted to the vehicle. That is, the target position, the guide route, and the driving route are delivered to the vehicle both at the arrival process and the departure process.

The target position is a final destination to be reached by the vehicle. For example, in a situation in which a vehicle enters a parking lot, the target position may be an empty parking spot in a parking zone of a parking lot. In a different situation in which a vehicle leaves a parking lot, the target position may be an empty parking spot in a pickup area of a parking lot. However, those are only exemplary target positions, and embodiments of the present disclosure are not limited thereto. For example, the target position may be a specific spot in the vicinity of an empty parking spot. For example, when there are several successive empty parking spots in a specific area of a parking lot, the target position may be a specific spot in the vicinity of the specific area. In this case, the vehicle autonomously drives to the specific spot, and the automated parking function of the advanced driver-assistance system (ADAS) mounted in the vehicle is activated so that the vehicle can be parked in a desired parking spot in the vicinity of the specific spot. The automated parking function of the ADAS may be a partially automated parking system (PAPS). In this case, the efficiency of management of the parking capacity of the parking lot can be improved. In this case, it is not necessary for the infrastructure to accurately calculate the target position. That is, only rough estimation for the target position is required. Therefore, it is possible to reduce computing resources for data processing.

The guide route is a path along which the vehicle needs to autonomously drive in the parking lot. The guide route is provided to the vehicle in the form of a series of instructions (for example, "drive 10 meters straight forward", "turn right at the corner", "drive 20 meters straight forward", "turn left", etc.). Alternatively, the guide route is provided to the vehicle in the form of lines including straight lines and curved lines drawn on a parking lot map. The lines indicate a driving lane extending from the current location of the vehicle to the target position. Alternatively, the guide route is composed of multiple waypoints and one target position marked on a parking lot map. For example, the guide route includes three pillars A1, B2, and C3 as the multiple waypoints and a parking slot D23 as the target position. When the guide route is expressed in the form of multiple waypoints and a target position, information on straight and/or curved lines and distances (for example, 10 m) is not required. Therefore, this guide route reduces the amount of information for V2I communication.

Each of the guide routes may be indicated with lighting devices. The lighting devices may be LED lamps. When the lighting devices illuminate, the guide route is displayed on the ground surface. In this case, the lighting devices are LED lamps that are buried in the ground of the parking lot. Alternatively, the lighting devices may be laser lamps installed on the ceiling, the wall surface, or pillars in a manner that the laser lamps emit a laser beam toward the ground surface of the parking lot. The vehicle detects the light emitted from the lighting devices with built-in sensors, thereby receiving or recognizing the guide route. For example, the vehicle detects the illumination of each of the lighting devices with the use of a front camera sensor.

According to various embodiments of the present disclosure, the entire movement path from the current position of the vehicle to the target position in the parking lot map is provided as a guide route. According to another embodiment, only a portion of the entire movement path from the current position of the vehicle to the target position in the parking lot map is provided as a guide route. In this case, power consumption for the provision of the guide route is reduced. In this case, a portion of the entire movement path provided as a guide route is determined on the basis of at least one of vehicle information, driving information, and environment information, as described later with reference to FIGS. 9A through 13B. For example, among all the LED lamps that are buried in the ground of a parking lot, LED lamps that need to emit light are determined on the basis of at least one of vehicle information, driving information, and environment information.

In step (3), the autonomous driving of the vehicle is performed in the parking lot. The autonomous driving of the vehicle is composed of driving, stopping, and re-driving. The autonomous driving of the vehicle is performed in accordance with the instructions of the infrastructure. Alternatively, the autonomous driving of the vehicle may be performed without relying on the instructions of the infrastructure. The vehicle can autonomously drive to the target position along the guide route that falls within a permitted driving area. During the autonomous driving of the vehicle, the vehicle is controlled to drive at or below a limited speed. This speed limit may be a value transmitted from the infrastructure to the vehicle or may be a value stored in the vehicle. In addition, the vehicle is controlled not to deviate beyond an error margin from the given guide route when driving along the guide route. This preset error margin may be a value transmitted from the infrastructure to the vehicle or may be a value stored in the vehicle. In addition, the vehicle turns with a predetermined minimum turning radius when it is necessary to turn during the autonomous driving along the guide route. This preset minimum turning radius may be a value transmitted from the infrastructure to the vehicle or may be a value stored in the vehicle. The vehicle is controlled not to exceed a predetermined maximum acceleration value when autonomously driving along the guide route. This preset maximum acceleration value may be a value transmitted from the infrastructure to the vehicle or may be a value stored in the vehicle.

In step (4), a position measurement is performed. The target of the position measurement may be a vehicle that is performing the autonomous parking operation, any obstacle existing in the parking lot, or another vehicle that is parked in the parking lot. The infrastructure measures the position of the vehicle or the obstacle and stores the measured position in a database. The infrastructure identifies and detects vehicles or obstacles and monitors each of the vehicles in the parking lot for the safety of the vehicles. Specifically, the infrastructure monitors a vehicle that is in the middle of performing autonomous parking at the target position and issues an appropriate instruction with respect to the vehicle. The vehicle can measure its position by itself. In this case, the vehicle transmits the measured position to the infrastructure. The position of the vehicle needs to be inside a predetermined position error margin. The predetermined position error margin is a value determined by the infrastructure. The vehicle detects obstacles present around the vehicle, measures the positions of the obstacles, and transmits the measured positions of the respective obstacles to the infrastructure. The frequency for communication between the vehicle and the infrastructure may be a predetermined frequency.

In step (5), an autonomous parking operation is performed. The autonomous parking performed in this step refers to an operation in which the vehicle enters an available parking spot after reaching the target position. The vehicle performs autonomous parking by sensing nearby obstacles or other vehicles that are parked therearound, with the help of a distance sensor mounted on the vehicle. Examples of the distance sensor mounted on the vehicle include an ultrasonic sensor, a radar sensor, a LiDAR sensor, and a camera.

In step (6), an emergency braking operation is performed. The emergency braking of the vehicle is performed according to the instruction of the infrastructure or is performed according to its own decision when the vehicle detects an obstacle. The infrastructure instructs the vehicle to apply an emergency brake when it is determined that the surroundings of the vehicle is unsafe. When the infrastructure determines that the surroundings of the vehicle become safe after entering an emergency stop state, the infrastructure instructs the vehicle to resume autonomous driving or autonomous parking. When the vehicle detects an obstacle, the vehicle applies an emergency brake according to its own decision. In this state, the vehicle notifies the infrastructure of the emergency stop event or the type or position of the obstacle which is the cause of the emergency stop. The vehicle reduces its speed according to a predetermined deceleration value that is preset for the emergency braking. This predetermined deceleration value is a value determined by the infrastructure or a value stored in the vehicle. The predetermined deceleration value varies depending on the type of an obstacle, the position of an obstacle, and the distance between the vehicle and an obstacle. The vehicle resumes autonomous driving or autonomous parking upon receiving a restart instruction from the infrastructure. Alternatively, the vehicle resumes the autonomous driving or autonomous parking when the vehicle self-confirms that the obstacle is removed. The vehicle reports the infrastructure of the restart of the autonomous driving or parking and of the removal of the obstacle. The vehicle detects the presence of a person or animal in the vehicle and applies an emergency brake when the presence of a person or animal is detected. The vehicle resumes autonomous parking or driving according to an instruction received from the infrastructure when the vehicle is in an emergency stop state. Alternatively, the vehicle determines, by itself, whether the cause of the emergency stop is removed and resumes autonomous parking or driving when it is confirmed that the cause of the emergency stop is removed.

In step (7), the automated valet parking procedure ends. After the vehicle completes the autonomous driving and the autonomous parking, the infrastructure issues a control release instruction. The vehicle can activate and deactivate the engine or the power supply according to an instruction received from the infrastructure or without depending on the instruction of the infrastructure. The vehicle can lock and unlock the vehicle doors according to an instruction received from the infrastructure or without depending on the instruction of the infrastructure. The vehicle can apply a parking brake according to an instruction received from the infrastructure or without depending on the instruction of the infrastructure.

In step (8), an error control operation is performed. The error control is performed when an error occurs in communication between the vehicle and the infrastructure and/or when a mechanical fault occurs in the vehicle. The infrastructure checks communication between the infrastructure and the vehicle for an error. The vehicle detects a communication error by monitoring the communication between the infrastructure and the vehicle. The vehicle detects whether a mechanical fault occurs by monitoring operating states of built-in accessories including sensors mounted thereon.

FIG. 5 is a diagram illustrating a communication process performed by a vehicle and an infrastructure for automated valet parking, according to one embodiment of the present disclosure.

In step (1), vehicle qualification information is delivered from the vehicle to the infrastructure. The vehicle qualification information includes an identifier that distinguishes each vehicle from the other vehicles. For example, the vehicle qualification information may be a unique number of the vehicle. The vehicle qualification information is transmitted at a stage in which the automated valet parking procedure is started after the vehicle enters a parking lot (see step (1) of FIG. 4A).

In step (2), an automated valet parking preparation instruction is transmitted from the infrastructure to the vehicle. The automated valet parking preparation instruction is transmitted before the vehicle starts its autonomous driving.

In step (3), vehicle information is transmitted from the vehicle to the infrastructure. The vehicle information includes status information and position information of the vehicle. The status information includes whether the vehicle is in a driving state, a parking stop state, or an emergency stop state. The vehicle information is transmitted periodically at a specific frequency (for example, 1 Hz which means once per second). The vehicle information is used as a parameter to determine whether a communication error has occurred between the vehicle and the infrastructure. For example, when the vehicle information does not reach the infrastructure at a specific time that is estimated on the basis of the communication frequency, the infrastructure determines that an error has occurred in communication between the vehicle and the infrastructure.

In step (4), an acknowledgment of the vehicle information is transmitted from the infrastructure to the vehicle. The acknowledgment of the vehicle information is transmitted at the same frequency as the transmission of the vehicle information that is transmitted in step (3). Therefore, the acknowledgment of the vehicle information is used as a parameter to determine whether an error has occurred in communication between the vehicle and the infrastructure. For example, when the vehicle information does not reach the infrastructure at a specific time that is estimated on the basis of the communication frequency, the infrastructure determines that an error has occurred in communication between the vehicle and the infrastructure.

In step (5), a target position and a guide route are transmitted from the infrastructure to the vehicle. The transmission of the target position and the guide route is performed either before or after an automated valet parking start instruction is transmitted from the infrastructure to the vehicle.

In step (6), driving area boundary information is transmitted to the vehicle from the infrastructure. The driving area boundary information includes markings (for examples, lines demarcating parking slots, a central line, and lane boundary lines demarcating a driving lane) that indicate the boundaries of a permitted driving area. The transmission of the driving area boundary information is performed after the automated valet parking preparation instruction is transmitted. This driving area boundary information is transmitted from the infrastructure to the vehicle in the form of a parking lot map.

In step (7), the automated valet parking start instruction is transmitted from the infrastructure to the vehicle. The transmission of the automated valet parking start instruction is performed after the guide route and the driving area boundary information are transmitted. Alternatively, the automated valet parking start instruction is transmitted when the cause of the emergency braking is removed.

In step (8), an emergency braking instruction is transmitted to the vehicle from the infrastructure.

In step (9), a vehicle control release instruction is transmitted to the vehicle from the infrastructure. The transmission of the vehicle control release instruction is performed after the vehicle is autonomously parked at the designated parking spot.

FIG. 6 is a diagram illustrating a communication process performed between a vehicle 200 and an infrastructure 100 for automated valet parking.

In step (1), the vehicle 200 reaches a parking lot and stops at a predetermined position. This stop position may be at an entrance gate of the parking lot. The vehicle 200 reports its arrival to the infrastructure 100. In step (2), the infrastructure 100 measures the dimensions of the vehicle 200 and authenticates the vehicle 200 on the basis of an authentication ID of the vehicle 200. In step (3), the infrastructure 100 transmits an authentication ID submission request to the vehicle 200. In step (4), the vehicle 200 transmits the authentication ID to the infrastructure 100. In step (5), the infrastructure 100 determines whether to allow entry of the vehicle 200 into the parking lot on the basis of the received authentication ID. In step (6), the infrastructure 100 provides the vehicle 200 with a notification that the entry of the vehicle 200 into the parking lot is allowed or is not allowed on the basis of the authentication result. For example, the infrastructure 100 displays a message indicating approval or disapproval of the entry of the vehicle into the parking lot on a display panel installed around the stop position. The driver drives the vehicle 200 to a drop-off area within the parking lot when the entry of the vehicle into the parking lot is allowed. In step (7), the driver turns off the ignition of the vehicle 200, gets out of the vehicle 200, locks the vehicle doors, and leaves the drop-off area. In step (8), a driving authority to control the vehicle 200 is delegated from the vehicle 200 (or the driver) to the infrastructure 100. In step (9), the infrastructure 100 notifies the driver that it takes the authority to control the vehicle 200 in the parking lot. Such a notification is sent to a driver's smart device through a mobile communication network.

FIG. 7 is a diagram illustrating a communication process performed between a vehicle 200 and an infrastructure 100 for automated valet parking.

In step (1), the infrastructure 100 transmits an engine activation request to the vehicle 200. In step (2), the vehicle 200 activates the engine at the request transmitted from the infrastructure 100. In step (3), the vehicle 200 activates the engine and then notifies the infrastructure 100 that the engine is activated. In step (4), the infrastructure 100 transmits an automated valet parking preparation request to the vehicle 200. In step (5), the vehicle 200 transmits a reply to the automated valet parking preparation request to the infrastructure 100. The reply is a message of OK indicating that the preparation for automated valet parking is completed or a message of NG indicating that the preparation for automated valet parking is not completed. In step (6), the infrastructure 100 transmits a synchronization request to the vehicle 200. The synchronization request is a request for instructing synchronization of time such that the timer of the infrastructure 100 is synchronized with the timer of the vehicle 200. For example, the synchronization request includes information about time indicated by the timer of the infrastructure 100. In step (7), the vehicle 200 performs the synchronization according to the synchronization request. In step (8), the vehicle 200 transmits a reply indicating that the synchronization is completed, to the infrastructure 100. For example, until the synchronization between the infrastructure 100 and the vehicle 200 is completed, a plurality of synchronization requests may be transmitted from the infrastructure 100 to the vehicle 200. In step (9), the infrastructure 100 transmits parking lot map information to the vehicle 200. The parking lot map information includes marking information. In step (10), the vehicle 200 estimates or calculates the position of the vehicle 200 on the basis of the transmitted marking information, and the vehicle 200 transmits the estimated position of the vehicle 200 to the infrastructure 100. In step (11), the infrastructure 100 determines a target position (for example, parking spot). In step (12), the infrastructure 100 transmits information on a permitted driving area to the vehicle 200. For example, the infrastructure 100 transmits boundary information of the permitted driving area to the vehicle 200. In step (13), the infrastructure 100 transmits a guide route to the vehicle 200. In step (14), the infrastructure 100 transmits an automated valet parking start instruction to the vehicle 200.

FIG. 8 is a flowchart illustrating an operation method of an infrastructure supporting automated valet parking, according to one embodiment of the present disclosure. FIGS. 9A to 13B are diagrams illustrating operations for changing a display range of a guide route changes, according to embodiments of the present disclosure. Operations described below relate to steps (1) through (3) shown in FIG. 4A.

Referring to FIG. 8, in step S810, an infrastructure (for example, the infrastructure 100 illustrated in FIG. 1) determines a guide route. The term "guide route" refers to a route along which a vehicle moves to reach a target position. According to one embodiment, the infrastructure may determine at least one parking space among a plurality of parking spaces existing in a parking lot as a target position, and determine a guide route that leads to the target position from the current location of the vehicle.

According to various embodiments, the infrastructure acquires at least one of vehicle information, driving information, and environment information in step S820.

The vehicle information includes at least one of vehicle type information and built-in sensor information of the vehicle. According to one embodiment, the vehicle information is transmitted to the infrastructure by the vehicle. According to another embodiment, the vehicle type information is obtained in a way that the infrastructure recognizes the vehicle length and the vehicle height or photographing the exterior of the vehicle.

The driving information includes at least one of lane change information, speed change information (for example, speed increase information and speed decrease information), and vehicle turn information. According to one embodiment, the infrastructure 810 acquires driving information by monitoring the vehicle moving in the parking lot. According to another embodiment, the infrastructure checks driving information on the basis of at least one item of data collected by at least one sensor mounted on the vehicle (for example, control information of the vehicle control unit 240 of FIG. 2).

The environment information includes at least one of parking lot information (for example, parking lot size), road surface condition, road structure, and motion information of surrounding vehicles. According to one embodiment, the infrastructure 810 obtains the environment information by detecting vehicles, objects, and obstacles in the parking lot and by monitoring the safety of each of the vehicles within the parking lot. According to another embodiment, the infrastructure receives sensing information from at least one vehicle (for example, interest vehicle or another vehicle) existing in the parking lot in order to obtain the environment information.

According to various embodiments, the infrastructure determines a display range of a guide route on the basis of at least one of vehicle information, driving information, and environment information in step S830. The display range is a partial route of the entire movement path from the current location of the vehicle to the target position on the parking lot map, in which the partial range is provided as a guide route.

According to one embodiment, the display range is determined on the basis of the environment information. As described above, the environment information includes at least one of parking lot information, road surface condition, road structure, and motion information of surrounding vehicles, and the infrastructure determines a display range corresponding to one or a combination of two or more items of the information.

For example, as shown in FIG. 9A, in a situation in which a vehicle C performs parking in a first-type parking lot (for example, large-sized parking lot), the infrastructure provides a guide route corresponding to a first display range 912 (refer to 910). Specifically, the first display range 912 has a sufficient size so that other objects existing in the parking lot can recognize the presence of the vehicle on the basis of the guide route. In addition, as shown in FIG. 9B, in a situation in which a vehicle C performs parking in a second-type parking lot (for example, small-sized parking lot), the infrastructure provides a guide route corresponding to a second display range 922 (refer to 920). Specifically, the infrastructure provides a guide route corresponding to the second display range 922 smaller than the first display range 912 in the second-type of parking lot, thereby preventing objects existing in the parking lot from interfering with the guide route. However, those display ranges are only exemplary display ranges, and embodiments of the present disclosure are not limited thereto. For example, the infrastructure may provide guide routes to be displayed in different patterns within the same display range on the basis of the vehicle information. For example, the pattern includes at least one of an illumination color, an illumination pattern, an illumination period, a count of illumination operations, and an illumination area.

Alternatively, as shown in FIG. 10A, in a situation in which no other vehicle exists in the driving direction of the vehicle or at around the vehicle, the infrastructure provides a guide route such that a guide route corresponding to a first display range 1012 is displayed (refer to 1010). In addition, as shown in FIG. 9B, in a situation in which another vehicle is present in the driving direction of the vehicle C or is present around the vehicle C, the infrastructure provides a guide route such that a guide route corresponding to a second display range 1022 different from the first display range 1012 is displayed (refer to 1020). Specifically, the infrastructure provides a guide route corresponding to the second display range 1022 larger than the first display range 1012 in a situation in which another vehicle is present in the driving direction of the vehicle C or is present around the vehicle C, objects in the parking lot can recognize the presence of the vehicle C on the basis of the guide route. However, those display ranges are only exemplary display ranges, and embodiments of the present disclosure are not limited thereto. For example, the infrastructure adaptively adjusts the display range according to the degree of overlap between the guide route of the vehicle and the guide route of another vehicle. For example, the infrastructure enlarges the display area of the guide route as the overlap of the two guide routes increases.

According to another embodiment, the display range is determined according to a request of the vehicle. The request may be a request for environment information that may occur in a situation in which the vehicle performs route guidance based on a precise map. As an example, the vehicle stores a precise map and data related to the guide route (for example, the display position of the guide route, the display size, the display status, etc.), and requests the environment information when matching the position of the vehicle, which is obtained by a positioning technique such as a GPS-based positioning technique, with position on the precise map. For example, as shown in FIG. 11A, in a situation in which a vehicle C does not request the environment information, that is, a case where the position of the vehicle C is matched with the position on a precise map, the infrastructure processes a guide route such that a first display range 1112 is displayed as the guide route (refer to 1110). Alternatively, as shown in FIG. 11B, in a situation in which the vehicle C requests the environment information, that is, a case where the position of the vehicle C is not matched with the position on a precise map, the infrastructure processes a guide route such that a first display range 1122 is displayed as the guide route (refer to 1120). For example, the infrastructure provides a guide route corresponding to the second display range 1122 that is larger than the first display range 1112 when the vehicle requests the environment information, thereby obtaining information required to match the position of the vehicle with the position on the precise map.

According to another embodiment, the display range is determined on the basis of the vehicle information. The infrastructure determines the display range by using sensor mounting information of the vehicle as the vehicle information. For example, as shown in FIG. 12A, in a situation in which a vehicle C mounted with a first sensor that senses objects in a first direction and a second sensor that senses objects in a second direction performs parking, the infrastructure processes a guide route such that a first display range 121 of the guide route is displayed (refer to 1210). In addition, as shown in FIG. 12B, in a situation in which a vehicle C mounted with only the first sensor that senses objects in the first direction (for example, forward direction) performs parking, the infrastructure processes a guide route such that a second display range 1222 is displayed (refer to 1220).

According to another embodiment, the display range is determined on the basis of the driving information. As described above, the driving information includes at least one of lane change information, speed increase/decrease information, and vehicle turn information, and the infrastructure determines a display range corresponding to one or a combination of two or more items of the information. For example, as shown in FIG. 13A, in a situation in which a vehicle C drives at a first speed (for example, 20 kph), the infrastructure processes a guide route such that a first display range 1312 is displayed (refer to 1310). In addition, as shown in FIG. 13B, in a situation in which a vehicle C drives at a second speed (for example, 40 kph), the infrastructure processes a guide route such that a second display range 1322 different from the first display range 1312 is displayed (refer to 1320).

According to another embodiment, the display range is determined on the basis of a combination of the vehicle information, the driving information, and the environment information. For example, after determining an increment value (for example, predefined increment value) for the display range for each of the vehicle information, the driving information, and the environment information, the display range may be determined based on the sum of these increment values. In this case, the infrastructure may apply weights to the respective increment values on the basis of priorities for the vehicle information, the driving information, and the environment information.

According to various embodiments of the present disclosure, in S840, the infrastructure provides a guide route to the vehicle (for example, automated valet parking device 100 illustrated in FIG. 1) on the basis of the determined display range. According to one embodiment, the infrastructure provides, as a guide route, some routes corresponding to the determined display range of the entire movement path ranging from the current position of the vehicle to the target position.

According to various embodiments of the present disclosure, an operation method of an infrastructure supporting an automated valet parking service includes: initiating an automated valet parking procedure for a vehicle; determining a target position for the vehicle and a guide route leading to the target position; determining a display range of the guide route on the basis of at least one of vehicle information, driving information, or environment information, and providing the guide route on the basis of the determined display range.

According to one embodiment, the display range is a portion of the entire movement path that leads from the current location of the vehicle to the target position.

According to one embodiment, the vehicle information includes at least one of vehicle type information and information on sensors mounted in the vehicle. In addition, the determining of the display range of the guide route includes: providing a first display range of the guide route or a second display range of the guide route on the basis of at least one piece of the vehicle information, the second display range being different from the first display range.

According to one embodiment, the environment information includes at least one of parking lot information, road surface condition, and motion information of surrounding vehicles. In addition, the determining of the display range of the guide route includes: providing a first display range of the guide route or a second display range of the guide route on the basis of at least one piece of the environment information, the second display range being different from the first display range According to one embodiment, the vehicle information includes at least one of lane change information, speed increase/decrease information, and vehicle turn information. In addition, the determining of the display range of the guide route includes: providing a first display range of the guide route or a second display range of the guide route on the basis of at least one piece of the environment information, the second display range being different from the first display range According to one embodiment, at least one of the vehicle information, the driving information, and the environment information each of which is information used to determine the display range is applied with a corresponding weight.

According to one embodiment, the determining of the display range of the guide route includes changing the display range at a request of the vehicle.

According to one embodiment, the display range of the guide route is determined on the basis of a predetermined display range corresponding to the vehicle information, the driving information, or the environment information.

According to one embodiment, the display range includes a range of LED lamps that illuminate among all the LED lamps buried in the ground of the parking lot.

According to various embodiments, an automated valet parking method includes: initiating an automated valet parking procedure for a vehicle; determining, by an infrastructure, a target position for the vehicle and a guide route leading to the target position; determining, by the infrastructure, a display range of the guide route on the basis of at least one of vehicle information, driving information, or environment information; providing, by the infrastructure, the guide route to the vehicle on the basis of the determined display range; and performing, by the vehicle, automated valet parking on the basis of the guide route.

According to one embodiment, the display range is a portion of the entire movement path that leads from the current location of the vehicle to the target position.

According to one embodiment, the vehicle information includes at least one of vehicle type information and information on sensors mounted in the vehicle. In addition, the determining of the display range of the guide route includes: providing a first display range of the guide route or a second display range of the guide route on the basis of at least one piece of the vehicle information, the second display range being different from the first display range.

According to one embodiment, the environment information includes at least one of parking lot information, road surface condition, and motion information of surrounding vehicles. In addition, the determining of the display range of the guide route includes: providing a first display range of the guide route or a second display range of the guide route on the basis of at least one piece of the environment information, the second display range being different from the first display range According to one embodiment, the driving information includes at least one of lane change information, speed increase/decrease information, and vehicle turn information. In addition, the determining of the display range of the guide route includes: providing a first display range of the guide route or a second display range of the guide route on the basis of at least one piece of the environment information, the second display range being different from the first display range According to one embodiment, at least one of the vehicle information, the driving information, and the environment information each of which is information used to determine the display range is applied with a corresponding weight.

According to one embodiment, the determining of the display range of the guide route includes changing the display range at a request of the vehicle.

According to one embodiment, the display range of the guide route is determined on the basis of a predetermined display range corresponding to the vehicle information, the driving information, or the environment information.

According to one embodiment the display range includes a range of LED lamps that illuminate among all the LED lamps buried in the ground of the parking lot.

According to one embodiment, the vehicle recognizes the guide route with the help of the sensors mounted therein.

According to various embodiments of the present disclosure, an infrastructure supporting automated valet parking is configured to perform the following steps: initiating an automated valet parking procedure for a vehicle; determining a target position for the vehicle and a guide route leading to the target position; determining a display range of the guide route on the basis of at least one of vehicle information, driving information, or environment information; and providing the guide route on the basis of the determined display range.

In one or more exemplary embodiments, the described functions may be implemented with hardware, software, firmware, or any combination thereof. When implemented with software, these functions may be stored on or transmitted to a computer-readable medium in the form of one or more instructions or codes. The computer-readable medium refers to any medium that is used to easily transfer a computer program from one computer to another. For example, it may be a communication medium or a computer-readable storage medium. The storage medium may be an arbitrary medium that can be accessed by a computer. The computer-readable media include, but are not limited to, RAMS, ROMs, EEPROMs, optical discs such as CD-ROM, magnetic disks, and any media that can be accessed by computers and which can be used to transfer a computer program in the form of instructions from one place to another. The computer-readable media are appropriately referred to as media that can be arbitrarily accessed by computers. For example, software can be transferred from websites, servers or, other remote sources through a cable or over a wireless channel. Examples of the cables include coaxial cable, fiber optic cable, twisted pair cable, and digital subscriber line (DSL), and the wireless channel uses infrared frequency waves, radio frequency waves, or ultra-high frequency waves. In this case, the coaxial cable, the fiber optic cable, the twisted pair cable, the DL, and the wireless channels fall within the definition of the medium. The disks or discs include a compact disc (CD), a laser disc (LD), an optical disc (OD), a digital versatile disc (DVD), a floppy disk (FD), and a Blu-ray disc. Discs generally refer to media from which data is optically read and disks refer to media from which data is magnetically read. Combinations of the above-mentioned media also fall within the definition of the computer-readable medium.

When embodiments are implemented as program code or code segments, the code segment may be a procedure, function, subprogram, program, routine, subroutine, module, software package, class, instructions, data structures, program command strings, or an arbitrary set of program command strings. One code segment may be connected with another code segment or a hardware circuit by transmitting and receiving information, data, arguments, parameters, or memory content. Information, arguments, parameters, data, and the like may be delivered, sent, or transmitted using any suitable means such as memory sharing, message delivery, token delivery, network transmission, and the like. In addition, in some aspects, steps and/or operations of a method or algorithm may reside on a mechanically readable medium and/or a computer-readable medium in the form of a combination or set of one or more codes and/or one or more instructions that can be integrated into a computer program product.

When implemented as software, the techniques described herein can be implemented as modules (for examples, procedures, functions, etc.) that perform the functions described herein. Software codes may be stored in a memory unit and may be executed by a processor. The memory unit may be embedded in a processor or may be provided outside a processor. In this case, the memory unit may be communicatively connected with the processor by various means known in the art.

When implemented as hardware, processing units may be implemented as one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, electronic devices designed to perform the functions described herein, or any combination of these.

The above-mentioned ones include one or more exemplary embodiments. Of course, the above-described embodiments do not cover all possible combinations of components and/or methods to implement the present disclosure. Thus, those skilled in the art will appreciate that many further combinations and substitutions of components and/or methods in various embodiments are possible. Accordingly, the above-described embodiments cover all such alterations, modifications, and variations that fall within the spirit and scope of the appended claims. Moreover, as to the scope of the terms "comprise" used in the detailed description or the appended claims, it is noted that it is similarly interpreted as "comprising" that is used as a transitional word in the claims.

As used herein, the terms "infer" and "inference" generally refer to a process of determining or inferring a state of a system, environment, and/or user from a set of observations of events and/or data. Inferring can be used to identify a specific situation or action, or can generate a probability distribution of certain states, for example. Inferring is probabilistic. That is, inferring may mean a calculation of a probability distribution of those states, based on study on data and events. Inferring may involve techniques used to construct a higher level event from a set of events and/or data. The inference refers to a process of inferring new events or actions from a set of observed events and/or stored event data, determining whether events are closely correlated in time, and determining whether the events and data come from one or several events and data sources.

Moreover, terms such as "component", "module", and "system" used herein may refer to, not necessarily, computer entities such as hardware, firmware, any combination of hardware and software, software, and a software program being executed. For example, the term "component" may refer to, not necessarily, a process running on a processor, a processor, an object, an executable execution thread, a program, and/or a computer. By way of illustration, both an application running on a computing device and the computing device itself may fall within the definition of the component. One or more components may reside within a process and/or an execution thread. One or more components may be collectively provided in one computer or distributed in two or more computers. In addition, these components can be executed on various computer readable media having various data structures stored thereon. Components can communicate a signal containing one or more data packets (for example, data from an arbitrary component that interacts with a local system, a component of a distributed system, and/or other systems on the basis of a signal that is transmitted over a network such as Internet) with a local and/or remote process.

The invention claimed is:

1. An operation method of an infrastructure supporting an automated valet parking service, the method comprising:
   initiating an automated valet parking procedure;
   determining a target position for a vehicle and a guide route that indicates a movement path from a current position of the vehicle to the target position;
   determining a portion of the movement path as a display range of the guide route based on at least one of vehicle information, driving information, or environment information;
   determining lighting devices installed at a position corresponding to the determined display range from among a plurality of lighting devices in the parking lot as lighting devices to be emitted, and
   providing the guide route using the determined lighting devices.

2. The method according to claim 1, wherein determining of the portion of the movement path as the display range of the guide route comprises:
   determining, based on at least one of the vehicle information, a first portion of the movement path as a first display range or a second portion of the movement path as a second display range that is different from the first display range,
   wherein the vehicle information comprises at least one of vehicle type information or built-in sensor information of the vehicle.

3. The method according to claim 1, wherein determining of the portion of the movement path as the display range of the guide route comprises:
   determining, based on at least one of the environment information, a first portion of the movement path as a first display range or a second portion of the movement path as a second display range that is different from the first display range,
   wherein the environment information comprises at least one of parking lot information, road surface information, road structure, or motion information of nearby vehicles.

4. The method according to claim 1, wherein determining of the portion of the movement path as the display range of the guide route comprises:
   determining, based on at least one of the driving information, a first portion of the movement path as a first display range or a second portion of the movement path as a second display range that is different from the first display range,
   wherein the driving information comprises at least one of lane change information, vehicle speed change information, or vehicle turn information.

5. The method according to claim 1, further comprising: applying a weight to at least one of the vehicle information, the driving information, or the environment information.

6. The method according to claim 1, wherein determining of the portion of the movement path as the display range of the guide route comprises:
   changing the display range at a request of the vehicle.

7. The method according to claim 1, wherein determining the display range of the guide route comprises:

determining the display range of the guide route based on a predetermined display range corresponding to the vehicle information, the driving information, or the environment information.

8. The method according to claim 1, wherein the display range comprises a range of LED lamps that illuminate among all LED lamps buried in a ground of a parking lot.

9. An automated valet parking method comprising:
 initiating an automated valet parking procedure;
 determining, by an infrastructure, a target position for a vehicle and a guide route that indicates a movement path from a current position of the vehicle to the target position;
 determining, by the infrastructure, a portion of the movement path as a display range of the guide route based on at least one of vehicle information, driving information, or environment information and determining lighting devices installed at a position corresponding to the determined display range from among a plurality of lighting devices in the parking lot as lighting devices to be emitted;
 providing, by the infrastructure, the guide route to the vehicle using the determined lighting devices; and
 performing, by the vehicle, autonomous driving toward the target position along the guide route.

10. The method according to claim 9, wherein determining the portion of the movement path as the display range of the guide route comprises:
 determining, based on at least one of the vehicle information, a first portion of the movement path as a first display range, or a second portion of the movement path as a second display range that is different from the first display range,
 wherein the vehicle information comprises at least one of vehicle type information or built-in sensor information of the vehicle.

11. The method according to claim 9, wherein determining the portion of the movement path as the display range of the guide route comprises:
 determining, based on at least one of the environment information, a first portion of the movement path as a first display range, or a second portion of the movement path as a second display range that is different from the first display range,
 wherein the environment information comprises at least one of parking lot information, road surface information, road structure, or motion information of nearby vehicles.

12. The method according to claim 9, wherein determining the portion of the movement path as the display range of the guide route comprises:
 determining, based on at least one of the driving information, a first portion of the movement path as a first display range, or a second portion of the movement path as the second display range that is different from the first display range,
 wherein the driving information comprises at least one of lane change information, vehicle speed change information, or vehicle turn information.

13. The method according to claim 9, further comprising: applying a weight to at least one of the vehicle information, the driving information, or the environment information.

14. The method according to claim 9, wherein determining the portion of the movement path as the display range of the guide route comprises:
 changing the display range at a request of the vehicle.

15. The method according to claim 9, wherein determining the display range of the guide route comprises:
 determining the display range of the guide route based on a predetermined display range corresponding to the vehicle information, the driving information, or the environment information.

16. The method according to claim 9, wherein the display range comprises a range of LED lamps that illuminate among all LED lamps buried in a ground of a parking lot.

17. The method according to claim 9, further comprising: detecting, by the vehicle, the guide route through sensors mounted in the vehicle.

* * * * *